Aug. 22, 1933.          J. P. LAVIGNE               1,924,072
ADJUSTABLE SHAFT MOUNTING AND METHOD OF ASSEMBLY
Filed April 19, 1928
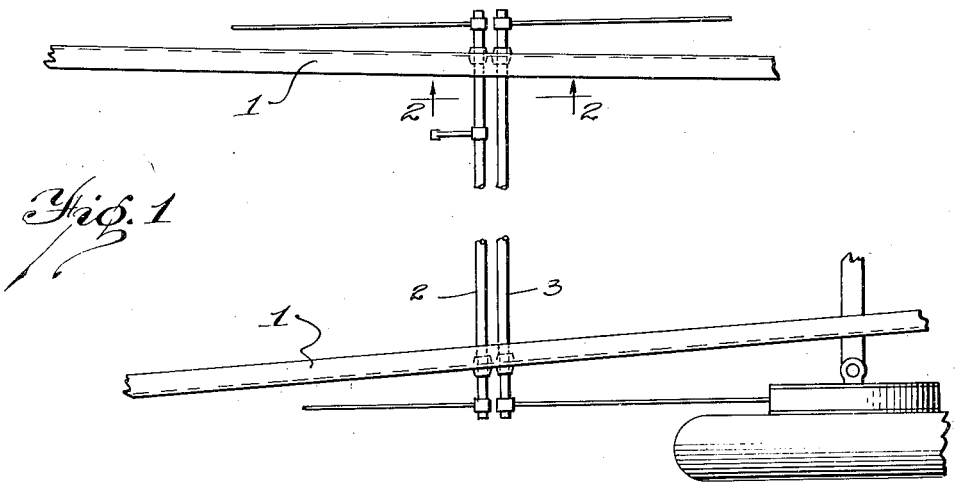
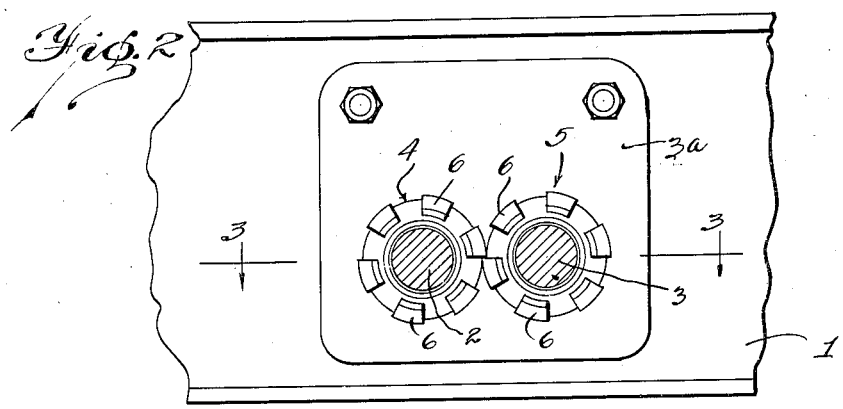
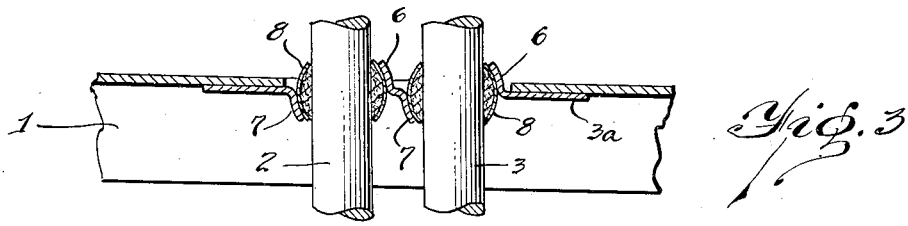
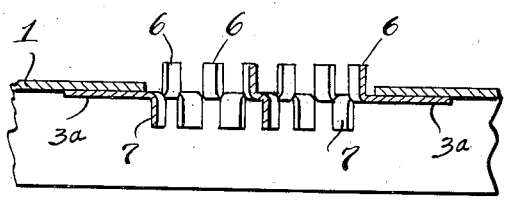
INVENTOR.
Joseph P. Lavigne
BY
Stuart C. Barnes
ATTORNEY.

Patented Aug. 22, 1933

1,924,072

UNITED STATES PATENT OFFICE 1,924,072

ADJUSTABLE SHAFT MOUNTING AND METHOD OF ASSEMBLY

Joseph P. Lavigne, Detroit, Mich., assignor, by mesne assignments, to O. & S. Bearing Co., Detroit, Mich., a Corporation of Michigan Application April 19, 1928. Serial No. 271,151

7 Claims. (Cl. 308—72)

This invention relates to an adjustable shaft mounting and method of assembly, and has to do particularly with the combination of a bearing of the self-lubricating type and an extremely simple, compact and inexpensive mounting therefor, and a novel manner of fixing the adjustable bearings within the mounting.

This invention is particularly adapted to locating and supporting oscillatory cross brake shafts in chassis frames for automobiles. The aligning of such cross brake shafts in chassis frames has become quite a problem in automobile chassis assembly, and many adjustable or self-aligning bearing mountings have been designed in an attempt to permit easy and accurate assembly and at the same time provide a rigid, efficient support for the shafts. These attempts have been more or less successful but they have all required relatively expensive and complicated shaft mountings and bearings.

It is the object of the present invention to provide a very simple and inexpensive mounting which may be quickly secured to the chassis frame either by welding or bolting, and which mounting is adapted to receive in adjustable relation a number of suitable self-lubricating bearings for supporting the cross brake shafts in proper alignment to permit easy operation.

Another object of the present invention contemplates a novel method of securing the self-lubricating bearings within the novel shaft mounting in such a manner that such bearings are quickly and easily fixed in adjusting position after the shafts have once been aligned. With this novel structure and method of assembly, it is possible to secure the shaft mounting plate to the chassis frame at any time, that is, either before or after the adjustable bearings have been positioned therein.

A further object of the present invention relates to the provision of an extremely simple shaft mounting, which consists of only two parts for a single shaft and three parts for a double shaft, the shaft mountings or bearings being fixed in adjusted position by the distortion of one of the parts thereof.

In the drawing:

Fig. 1 is a diagrammatical fragmentary plan view illustrating the general application of my invention to cross brake shafts of an automobile chassis frame.

Fig. 2 is a view taken on line 2—2 of Fig. 1, illustrating one manner of securing the shaft mounting plate to the chassis frame.

Fig. 3 is a sectional view taken on line 3—3 of Fig. 2 showing the manner of fabricating the shaft mounting plate for receiving the adjustable bearings and the manner of securing the same in fixed adjusted position.

Fig. 4 is a sectional view similar to Fig. 3 but showing the manner of fabricating the shaft mounting plate before assembly, or where such plate is adapted to be secured to the frame before assembly of the bearings therein.

An automobile chassis frame of the standard type is generally designated as at 1 in Fig. 1, and the standard cross brake shafts are designated as at 2 and 3.

While the shaft mounting contemplated in the present invention is adapted to receive and align a single shaft, it is particularly well adapted to double cross brake shafts for use with four wheel brakes, and the same has been so illustrated. Such shaft mounting consists of a single plate 3a which is of a size as to be conveniently mounted within the flanges of the chassis frame and which is preferably formed of a single piece of sheet steel suitably secured to the chassis frame either by welding or by suitable removable means. Due to this peculiar design the present shaft mounting and the plate 3a therefor is adapted to receive cross shafts which may be located very closely together.

This plate 3 is suitably stamped or fabricated to provide in general apertures 4 and 5. This stamping or fabricating is such that an annular series of struck-out and spaced prongs or lugs 6 are formed on one side of each aperture and a similar series of alternately spaced prongs or lugs 7 formed on the other side of each aperture.

Each aperture 4 and 5 with its struck-out lugs, is adapted to freely receive a spherical bearing member 8. This bearing member 8 is preferably of the adjustable self-lubricating type in that it is provided with an outer spherical shell and an inner bushing formed of lubricant impregnated fabric and pressed into shape whereby to resiliently receive and support the cross shafts. The pressure applied to this impregnated fabric is relatively great, and the construction is such that not only is there no metallic contact but the bearing is noiseless, and due to its resiliency is capable of wearing for a relatively long time.

In assembling the adjustable shaft mounting, the spherical bearing members 8 may be placed in the position in the apertures and if necessary the lugs or prongs 6 and 7 slightly bent over to adjustably hold the same in place. The shaft mounting plate 3a may be then secured in position at each side of the chassis frame, the shafts inserted therein and the prongs 6 and 7 securely clamped into place to hold the shafts in the correct alignment and at the same time permit free, noiseless and positive movement.

Another way of assembling this shaft member is to secure the plate 3a to the chassis frame, as shown in Fig. 4, insert these spherical bearing members 8 in the apertures 4 and 5 together with the cross brake shafts, and then clamp the lugs or prongs to fix the bearing members in adjusted aligned position. This latter method permits the plates to be mounted at the time of assembly or fabrication of the chassis frame, and at the time of the assembly of the cross brake shafts it is only necessary for the operator to insert the spherical bearing members in place and then clamp them in adjusted position by peaning or forcing down the prongs. It will be obvious that any suitable tool may be used for forcing the prongs 6 and 7 into fixed position, but of course they may be also individually forced into position by means of a hammer or the like, and such method will suffice for the purpose of the present invention.

It will thus be seen that I have provided an extremely simple and inexpensive but efficient and positive shaft mounting for cross brake shafts and the like, which consists of a minimum number of parts easily and quickly fabricated and assembled. This shaft mounting permits of accurate alignment, and the self-lubricating feature permits of continuous lubrication together with noiseless operation and long wear.

What I claim is:

1. A mounting for the rotatable shafts, comprising a single supporting plate stamped to provide integral bearing supporting members and a spherical self-lubricating bearing clamped into aligning position by said members.

2. A mounting for rotatable shafts comprising spherical bearing members for receiving the shaft or shafts, and an integral supporting plate provided with oppositely stamped alternately spaced prongs for clamping said bearing members in aligned position.

3. A mounting for rotatable shafts comprising a supporting plate, and an aperture formed in said plate and defined by oppositely bent prongs around the periphery thereof, said aperture and said prongs being adapted to rotatably receive a bearing member for supporting a shaft, and said prongs being adapted to be pressed against the bearing member to fix the same in adjusted position.

4. A mounting for rotatable shafts comprising a single sheet metal supporting plate provided with an integral stamped-out portion for adjustably receiving a bearing member together with its shaft, said stamped out portion being distortable to secure the bearing in fixed adjusted position.

5. A mounting for rotatable shafts, comprising a bearing formed of a spherical shell and a compressed lubricant impregnated fabric contained therein and forming a bushing for the shaft, and a supporting plate having integral oppositely struck-out prongs for adjustably receiving said bearing, said prongs being adapted to be bent into place against said bearing to fixedly secure the same in adjusted position.

6. A mounting for receiving a relatively rotatable part, comprising a bearing formed of a substantially spherical shell and a compressed lubricant impregnated fabric contained therein for forming a bushing for the relatively rotatable part, and a single supporting plate having a stamped out portion for receiving said bearing, said stamped out portion and said bearing shell being relatively distorted whereby to fixably secure the bearing in positive permanent relation to said supporting plate.

7. A mounting for a cross brake shaft for vehicles comprising, a bearing member consisting of a spherical shell and a lubricant impregnated fabric bushing preformed and permanently contained in said shell for directly receiving one end of the shaft, a supporting member adapted to be rigidly mounted as a single unit on a frame of said vehicle, said member having portions formed with spherical contours for adjustably receiving said shell to permit shipping and handling as a unit, said portions fixably clamping said spherical bearing member in adjusted position and being limited in clamping action only by the surface of said shell.

JOSEPH P. LAVIGNE.